United States Patent [19]

Schwär et al.

[11] Patent Number: 4,665,659

[45] Date of Patent: May 19, 1987

[54] GRINDER FOR GRINDING AN END SURFACE OF A CYLINDRICAL WORKPIECE

[75] Inventors: Rudolf Schwär; Detlef Thiemann, both of Wuppertal, Fed. Rep. of Germany

[73] Assignee: Maschinenfabrik Ernst Thielenhaus GmbH, Wuppertal, Fed. Rep. of Germany

[21] Appl. No.: 864,446

[22] Filed: May 16, 1986

[30] Foreign Application Priority Data

May 17, 1985 [DE] Fed. Rep. of Germany ....... 3517764

[51] Int. Cl.⁴ .......................................... B24B 41/00
[52] U.S. Cl. ................ 51/129; 51/215 UE; 51/215 CP; 51/236
[58] Field of Search ............ 51/129, 131.1, 236, 51/237 R, 215 UE, 215 CP, 215 R, 131.3–131.4

[56] References Cited

U.S. PATENT DOCUMENTS

| | | | |
|---|---|---|---|
| 2,369,094 | 2/1945 | Weaver | 51/236 |
| 3,176,434 | 4/1965 | Miyabayashi | 51/215 UE |
| 3,226,886 | 1/1966 | Seidel | 51/215 R |
| 3,601,927 | 8/1971 | Kikuchi | 51/215 R |
| 4,030,252 | 6/1977 | Price | 51/215 CP |
| 4,038,785 | 8/1977 | Scott | 51/215 CP |

*Primary Examiner*—Frederick R. Schmidt
*Assistant Examiner*—Robert A. Rose
*Attorney, Agent, or Firm*—Karl F. Ross; Herbert Dubno

[57] ABSTRACT

A cylindrical workpiece has an end face ground on two synchronously driven supporting rollers, by a grinding tool mounted on a drive shaft in front of the supporting rollers, and a loading mechanism and an unloading mechanism. The loading mechanism and the unloading mechanism are a simply functioning loading and unloading unit which has a carriage mounted above the supporting rollers limitedly slidable back and forth on an upright frame portion and two bent workpiece carriers supported on the upright frame portion pivotable about horizontal pivot axes. Each of the two bent workpiece carriers is pivotally connected by a link member to the carriage and has a working arm which is provided with a holder and with a pressing roller enclosed in the holder with a predetermined clearance. The bent workpiece carriers are pivotable with the back and forth motion of the carriage so that the working arms alternatingly pivot between a grinding position and a loading and unloading position. In the loading and unloading position the blank is forced with the help of a pushing member acting parallel to the rotation axis of the supporting rollers into the holder. Then a finished part in the holder is forced out by the blank and fed to the discharge shaft.

8 Claims, 9 Drawing Figures

GRINDER FOR GRINDING AN END SURFACE OF A CYLINDRICAL WORKPIECE

FIELD OF THE INVENTION

Our present invention relates to a grinding machine, and more particularly, to a grinder for grinding an end surface of a cylindrical workpiece.

BACKGROUND OF THE INVENTION

A grinder or honer for finishing or superfinishing an end surface of a cylindrical workpiece can comprise two synchronously driven supporting rollers, a workpiece bracing mechanism behind the supporting rollers, a drive shaft with a grinding tool in front of the supporting roller, and a loading and unloading mechanism.

The blanks to be worked are fed to the grinding station through an admitting shaft, while the finished parts to be processed further are taken from the machine through a discharge shaft.

The cylindrical workpiece usually is composed of steel, and can be a mass produced push rod, which must be manufactured with a high precision.

In the past, the loading and unloading mechanisms have been independent units with coupled independent drives. The loading mechanism serves exclusively for loading. It takes a blank to a position downstream of the feed shaft or to a connected feed conduit where the blank is pressed by a pressing roller of the supporting rollers during grinding while it lies on a workpiece guide mechanism under pressure from the grinding tool. Correspondingly the unloading mechanism operates as it were in reverse sequence when the grinding process ends to takeup the finished part and remove it from the grinding station.

When the loading mechanism is removed and the pressing roller has been raised the unloading mechanism takes the finished part with a suitable structural part and feeds it to the discharge shaft or a discharge passage connected to it. This means that the loading and unloading time can frequently be greater than the grinding time.

OBJECTS OF THE INVENTION

It is an object of our invention to provide an improved grinder for grinding an end face of a cylindrical workpiece whereby the earlier drawbacks are obviated.

It is another object of our invention to provide an improved grinder for grinding an end face of a cylindrical workpiece having an unloading and loading mechanism which operates with improved speed in a very short time.

SUMMARY OF THE INVENTION

These objects and others which will become more readily apparent hereinafter are attained in accordance with our invention in a grinder for grinding an end face of a cylindrical workpiece comprising two synchronously driven supporting rollers, a workpiece bracing mechanism behind the supporting rollers, a grinding tool mounted on a drive shaft in front of the supporting rollers, and a loading and an unloading mechanism. A blank to be processed is fed to the mechanism through an admitting shaft and the finished part is discharged through a discharge shaft.

According to our invention the loading and unloading mechanism is a single loading and unloading unit which has a carriage mounted above the supporting rollers limitedly slidable back and forth (i.e. reciprocatable) on an upright frame portion and two bent workpiece carriers or arms pivotable on the upright frame portion about respective horizontal pivot axes. Each of the two bent workpiece carriers is pivotally connected by a link member to the carriage and has a working arm which is provided with a holder and a pressing roller enclosed in the holder with a limited but predetermined penetration into the seat for the workpiece on the holder.

The bent workpiece carriers are pivotable with the back and forth motion of the carriage so that the working arms alternatingly pivot between a grinding position and a loading and unloading position. In the loading and unloading position the blank is forced with the help of a pushing member acting parallel to the rotation axis of the supporting rollers into the holder. Simultaneously a finished part in the holder is forced out by the blank and fed to the discharge shaft. During this pushing action, the other arm and its pressing roll hold another workpiece against the support rolls in grinding position. The arms swing alternately into and out of the grinding position.

In our grinder a blank is mounted in the loading and unloading unit while the grinding process occurs at one of the bent workpiece carriers. That means that the loading or unloading time can be no longer than the grinding time. There is a very slight idle time during the pivotal motion of the bent workpiece carriers which can be performed with high speed. Thus simple control means can be provided. In our invention the carriage is connected by an adjusting rod to at least one pivotally mounted controlling lever which contacts or is operatively connected to a controlling cam disk and the controlling disk is dimensioned and driven according to the cycle time for the grinding and loading and unloading processes.

The bent workpiece carriers are inverted U shaped arms in one particular form of our invention. The mechanism associated with the bent workpiece carriers for mounting the blank and feeding the blank and later removing the finished article can be made very simply and compactly. The working arms of the bent workpiece carrier with the holders are received in grooves in the supporting rollers.

In an alternative embodiment according to our invention each of the working arms of the bent workpiece carriers is received in spaces between a pair of spaced-apart disks comprising each supporting roller. The blank can be mounted without trouble when the workpiece holder seat has a diameter which is greater than the diameter of the workpiece in order to provide some play and the aforementioned penetration of the pressing roller is greater than the play of the workpiece in the seat.

The key to our invention is that in the loading and unloading unit both bent workpiece carriers can be operated by a single sliding carriage, which is operated by an adjusting rod and a controlling lever and travels according to the dimensions of a controlling disk. Thus both workpiece carriers continually pivot together to the left or the right and thus with their working arms alternately move from their working position into a loading or unloading position. As a result the loading or unloading process can be performed in an extremely short time with our invention.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
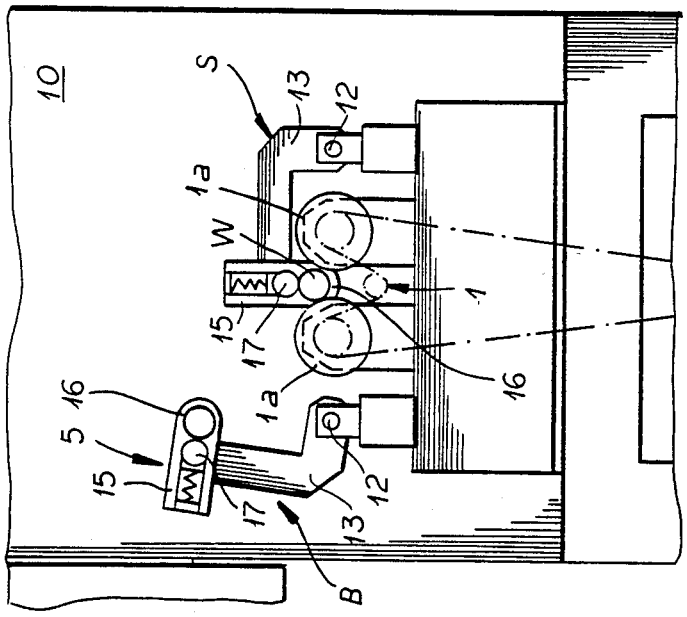
FIG. 1 is a schematic rear elevational view of part of a grinder according to our invention in one operating configuration.

The grinder shown in the drawing is used to grind an end surface of a cylindrical workpiece. A comparison of FIGS. 1 to 3 makes the basic structure of our grinder apparent. The grinder shown in the drawing comprises a workpiece support 1 with two synchronously driven supporting rollers 1a, a workpiece bracing mechanism 2 (having an axially displaceable member 18) behind the supporting rollers 1a, a grinding tool 4 in front of the supporting rollers 1a driven with a drive shaft 3, and a loading and unloading unit 5. The blank to be worked is fed into the grinder through an admitting shaft 6, while the finished part to be processed further is taken from the machine through a discharge shaft 7. A feed stretch or ramp 8 is connected to the admitting shaft 6 and a discharge stretch or ramp 9 is connected to the discharge shaft 7 for each pickup and ejection position.

The loading and unloading occurs with the help of a simply functioning loading and unloading unit 5. Its individual parts are apparent from FIG. 4.

Figure 4:
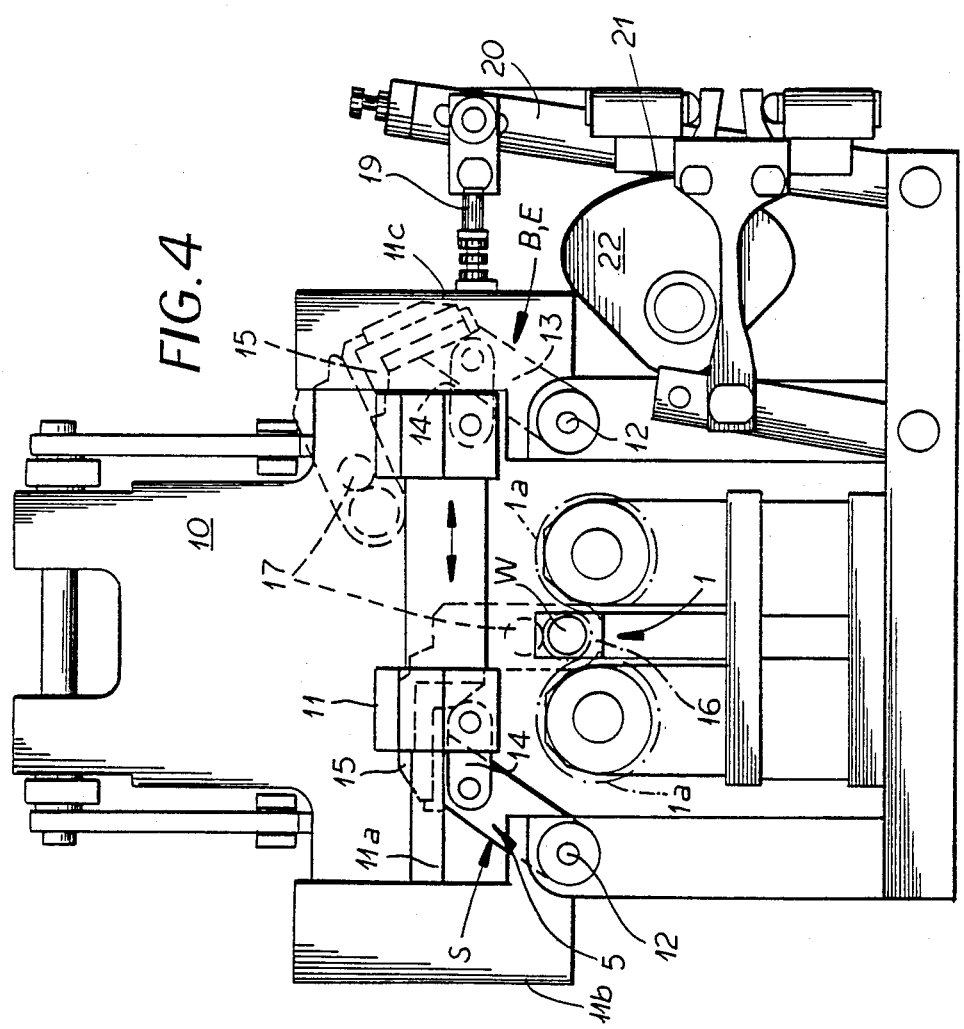
FIG. 4 is an enlarged cross sectional view of the grinder of FIG. 1 corresponding to FIG. 2 with additional structural details included.

A carriage 11, limitedly slidable back and forth in a horizontal direction on bars 11a of which only one is seen in FIG. 4 in guides 11b of the frame, mounted above the supporting rollers 1a is a part of the loading and unloading unit 5. It also has two bent workpiece carriers 13 mounted on an upright frame portion 10 pivotable about horizontal axes 12, which are each pivotally connected with the carriage 11 by link members 14.

Figure 5A:
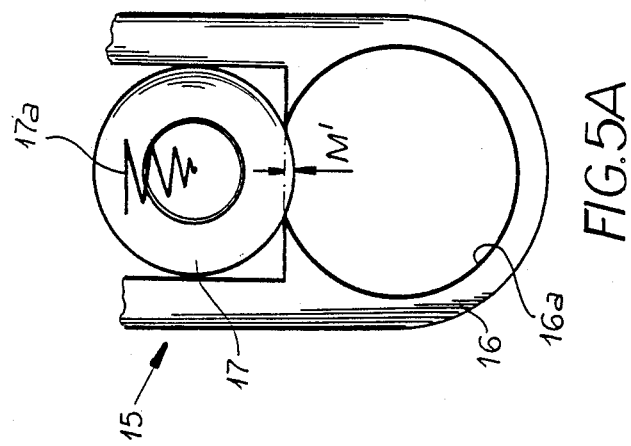
FIG. 5A is a view similar to FIG. 5 showing the penetration of the pressure roll into the seat for the workpiece on one of the transfer arms.
Figure 5:
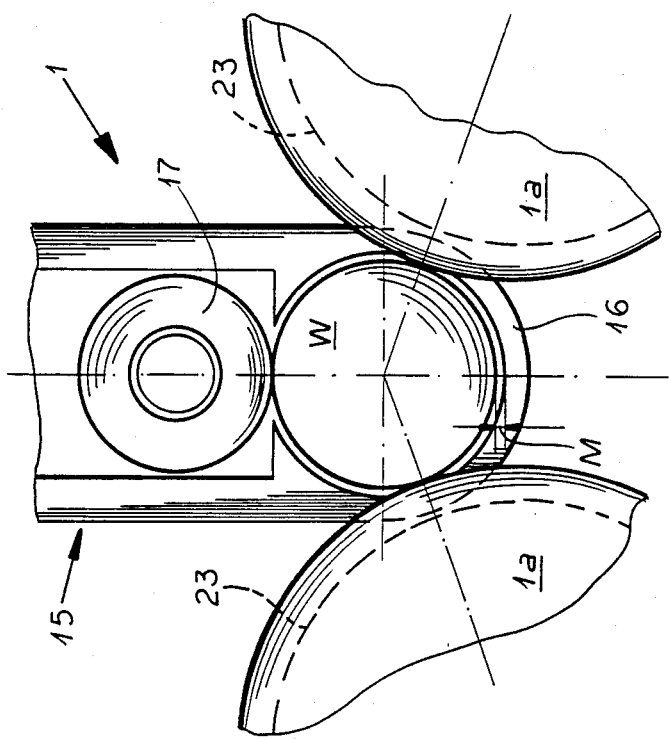
FIG. 5 is a diagram showing the workpiece support from the grinding machine of FIG. 1.

The bent workpiece carriers 13 each have a working arm 15 which is provided with a holder 16 and a pressing roller 17 enclosed in the holder 16 with a predetermined degree of penetration $W^1$ into the seat 16a (FIGS. 5 and 5A).

This penetration is at least equal to the plug M of the workpiece W in the seat.

Figure 2:
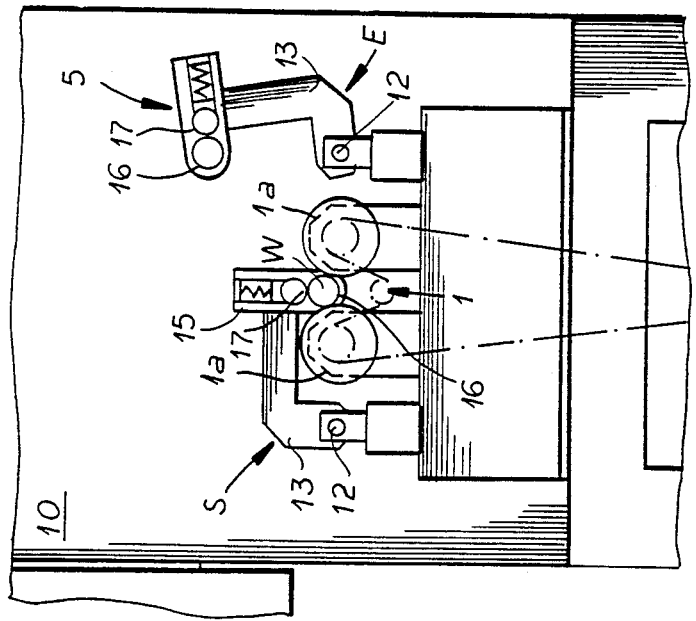
FIG. 2 is a schematic rear elevational view of the grinder of FIG. 1 in another of its operating configurations.
Figure 3:
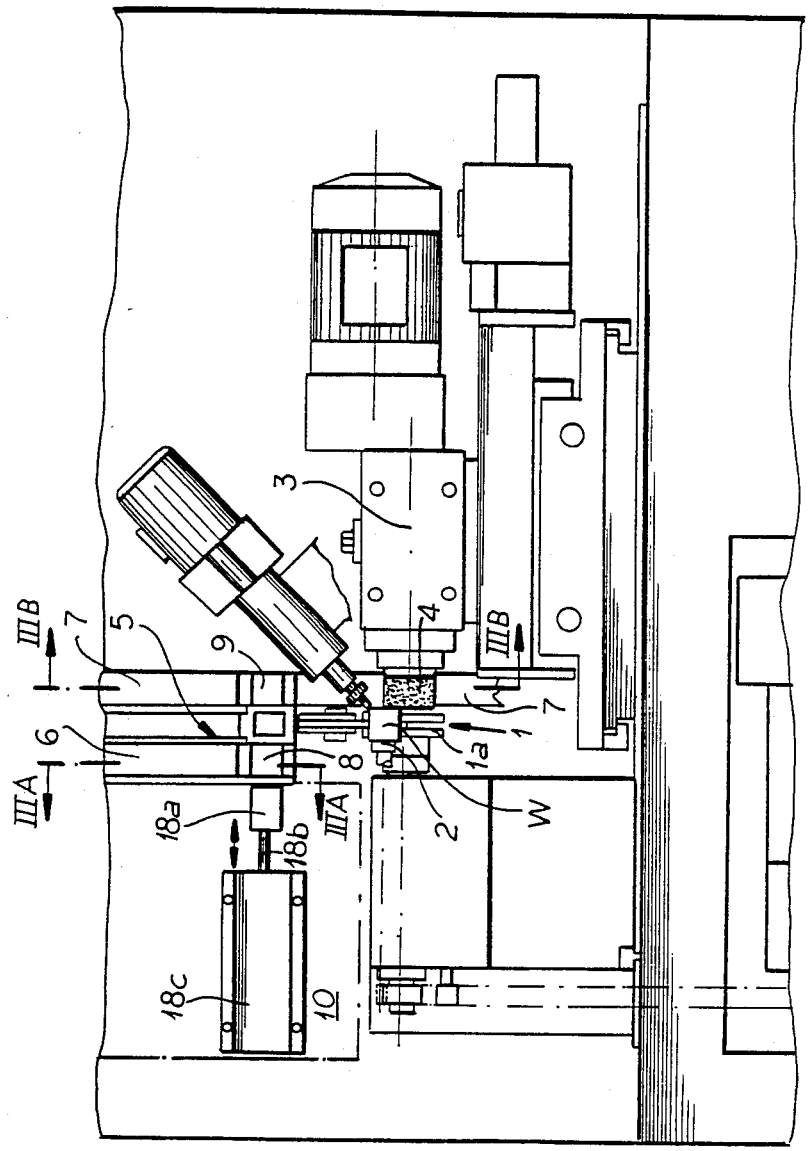
FIG. 3 is a schematic side elevational view of the grinder of FIG. 1.
Figure 3A:
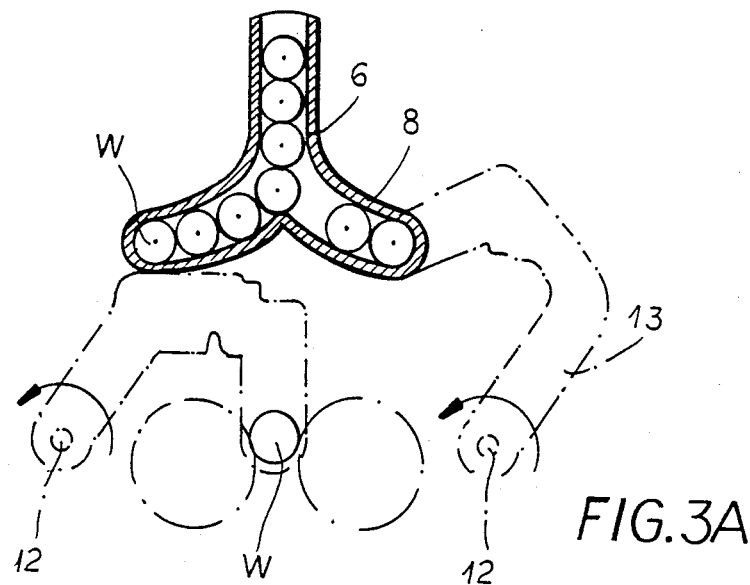
FIG. 3A is a section along line IIIA—IIIA of FIG. 3 through the feed chute and delivery ramps only showings its relationship to the pickup positions of the transfer arms.
Figure 3B:
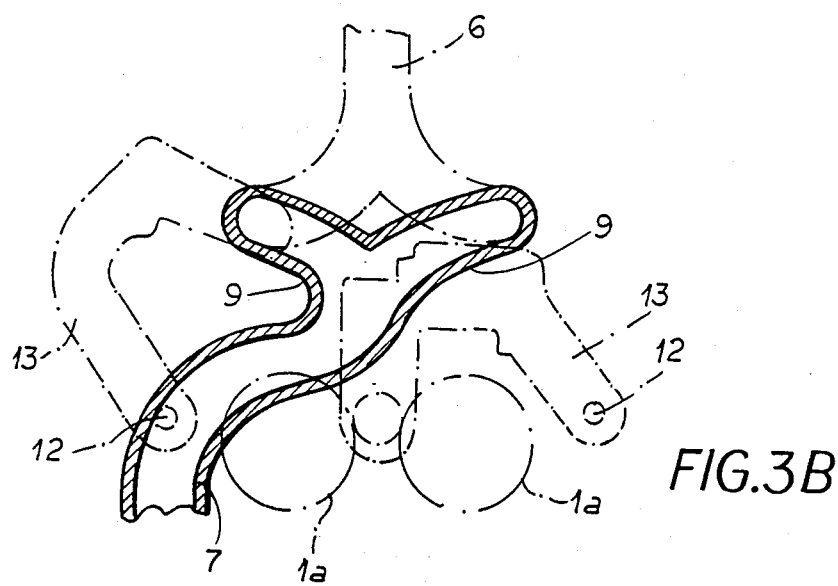
FIG. 3B is a section along line IIIB—IIIB of FIG. 3 through the discharge chute and its ramps, showing its relationship to the pickup and discharge positions.

The bent workpiece carriers 13 are pivotable during the back and forth motion of the sliding carriage 11 in a cycle with their working arms 15 alternating between a grinding position S and a loading position B or an unloading position E which can coincide for each arm and are distinguished here only for convenience of describing the operation (FIGS. 1 and 2).

The grinder mechanism is such that with one bent workpiece carrier 13 in the loading and unloading position B or E during the grinding process occuring at the other bent workpiece carrier 13 in the grinding position S a blank fed through the feed shaft 6 and the feed passage 8 is loadable into the holder 16 with the help of a pushing member 18a acting parallel to the axial direction of the supporting rollers 1a. To this end, each pusher at position B or E of each arm is mounted on a rod 18b displaced by a pneumatic cylinder 18c.

Thus a finished part already in the holder 16 is pushed out by the new blank from shaft 6 into the discharge shaft 7. As a result each bent workpiece carriers 13 performs both a loading function and also an unloading function. Moreover they each hold the workpiece W fixed on the supporting rollers 1a.

From FIG. 4 it is clear that the carriage 11 is connected by an adjusting rod 19 to a pivotally supported controlling or cam-follower lever 20 which contacts a bearing surface 21 on a controlling disk or cam 22. The controlling disk 22 is formed and driven according to the cycle time for the grinding work as well as the loading and unloading process. The bent workpiece carriers 13 are constructed as inverted U shaped arms which allows a comparatively compact structure. The working arms 15 of the bent workpiece carriers 13 with the holders 16 (FIG. 5) are received in grooves 23 in the supporting rollers 12. The pressing rollers 17 can be spring biased into the respective seat as represented by the spring 17a in FIG. 5A.

Figure 6:
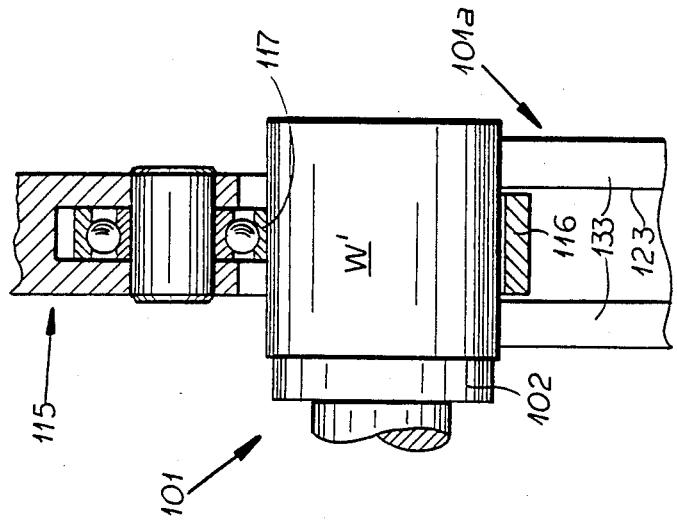
FIG. 6 is a partially side elevational, partially cross sectional view of an alternative embodiment of a work piece support for our invention similar to that of FIG. 5.

In an alternative embodiment shown in FIG. 6 the working arms 115 are engageable in the intervening spaces 123 between two disks 133 making up an individual supporting roller 101a. The holder 116 has a diameter which is larger than the diameter of the workpiece $W^1$ in order to provide some motion play. The play for the work piece $W^1$ is larger than the penetration of the pressing roller 117 into the work holder 116.

We claim:

1. In a grinder for grinding an end face of a cylindrical workpiece comprising two synchronously driven supporting rollers, a workpiece brace behind said supporting rollers, a grinding tool mounted on a drive shaft in front of said supporting rollers, a loading and unloading mechanism, wherein a blank to be worked is fed in through an admitting shaft and a finished part is discharged through a discharge shaft, the improvement wherein said loading and unloading mechanism are formed by a single loading and unloading unit having a carriage mounted above said supporting rollers limitedly slidable back and forth on an upright frame portion and two bent workpiece carriers supported on said upright frame portion pivotally about horizontal pivot axes, each of said carriers being pivotally connected by a link member to said carriage, each of said workpiece carriers has a working arm which is provided with a holder having a seat for a respective blank and a pressing roller in said holder with a predetermined penetration into said seat and said bent workpiece carriers are pivotable with said back and forth motion of said carriage with each of said working arms alternatingly pivotable between a grinding position and a loading and unloading position and in said loading and unloading position a new blank is displaced by a pushing member acting parallel to the rotation axis of said supporting rollers into said workpiece holder and a finished blank in said workpiece holder is forced by said new blank to said discharge shaft.

2. The improvement according to claim 1 wherein said carriage is connected by an adjusting rod to at least one pivotally mounted controlling lever which contacts a controlling disk dimensioned and driven according to a cycle time for said grinding and the loading and unloading process.

3. The improvement according to claim 2 wherein said bent workpiece carriers are inverted U shaped arms.

4. The improvement according to claim 3 wherein said working arms of said bent workpiece carriers with said holders are received in grooves in said supporting rollers.

5. The improvement according to claim 3 wherein each of said working arms of said bent workpiece carriers is engageable in intervening spaces between pairs of disks mounted opposite each other and comprising said supporting rollers.

6. A grinder for grinding the an end surface of a cylindrical workpiece comprises:
   two synchronously driven supporting rollers;
   a workpiece guide mechanism mounted behind said supporting rollers;
   a grinding tool mounted on a drive shaft in front of said supporting rollers,
   an admitting shaft for receiving a blank to be processed and a discharge shaft through which a finished part is discharged; and
   a loading and unloading mechanism which is a simply functioning loading and unloading unit, including:
      a carriage mounted above said supporting rollers limitedly slidable back and forth on an upright frame portion,
      two bent workpiece carriers supported on said upright frame portion pivotable about horizontal pivot axes,
      a linking member connecting each of said bent workpiece carriers with said carriage,
      a holder for said workpiece with a pressing roller for engaging and holding said workpiece mounted on a working arm of each of said bent workpiece carriers, so that said bent workpiece carriers are pivotable with said back and forth motion of said carriage with each of said working arms alternating between a grinding position and a loading and unloading position, and
      a pushing member acting parallel to the rotation axis of said supporting rollers to force said blank into said holder and to push out said finished part.

7. An apparatus for transferring cylindrical workpieces to a grinding station for grinding an end face of each workpiece, said apparatus comprising:
   a support;
   a pair of bent arms pivotally mounted on said support and swingable synchronously and simultaneously so that free ends of said arms are alternately swung into said grinding station while a free end of the other of said arms is in a loading/unloading position;
   a respective workpiece holder on each of said free ends, said holder having a seat receiving said workpiece with play, and a pressing roller penetrating into said seat and bearing upon a respective workpiece in said seat in said grinding station;
   a feed chute, juxtaposed with each seat on one side of the respective holder in the loading/unloading position the respective arm, and a discharge chute juxtaposed with each section an opposite side thereof in the loading/unloading position of the respective arm; and
   a respective pusher displaceable parallel to axes of swinging motion of said arms at said one side of each holder in the respective loading/unloading position for pushing a workpiece from the respective feed chute into the respective seat and thereby pushing a ground workpiece from the respective seat into the respective discharge chute.

8. The apparatus defined in claim 7, further comprising a carriage reciprocatable on said support orthogonally to said axes and said pusher and coupled to said arms for displacing same.

* * * * *